Aug. 6, 1935.     A. N. CRAMER     2,009,994
PRESS FOR FORMING GLASS ARTICLES
Filed June 3, 1932     3 Sheets-Sheet 1

INVENTOR
Albert N. Cramer

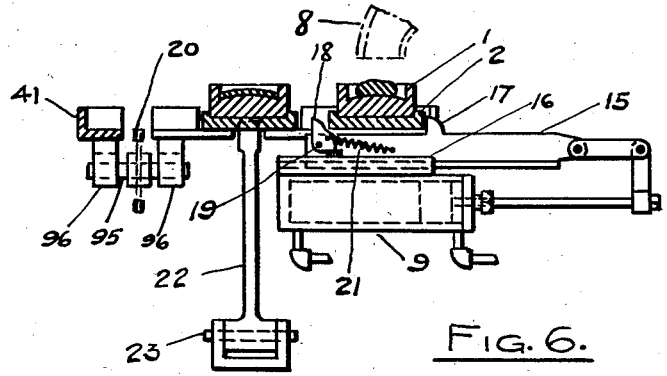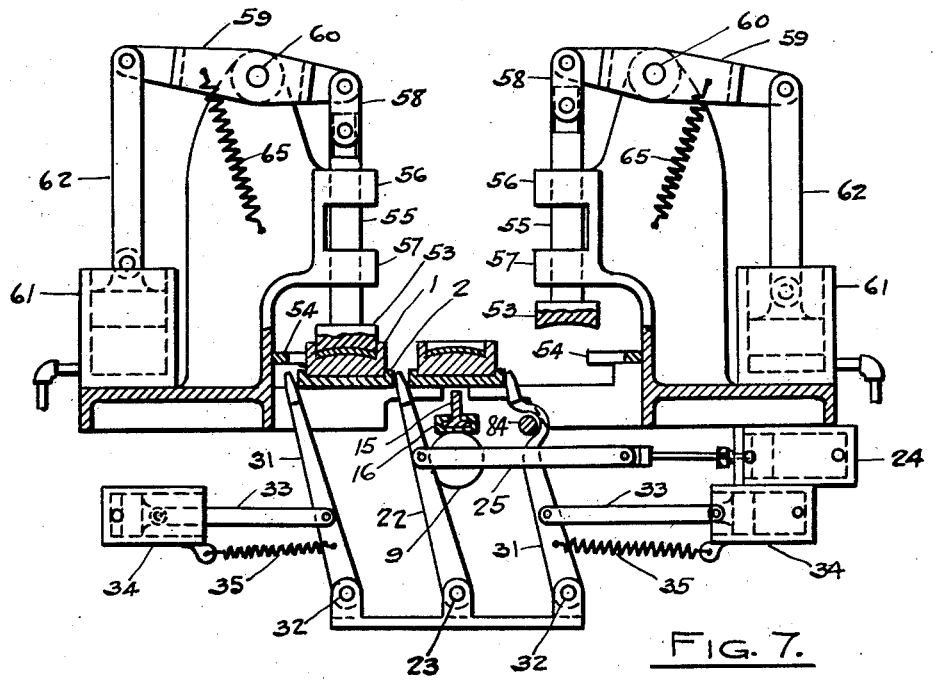

Aug. 6, 1935.  A. N. CRAMER  2,009,994
PRESS FOR FORMING GLASS ARTICLES
Filed June 3, 1932  3 Sheets-Sheet 3

INVENTOR
Albert N. Cramer

Patented Aug. 6, 1935

2,009,994

UNITED STATES PATENT OFFICE 2,009,994

PRESS FOR FORMING GLASS ARTICLES

Albert N. Cramer, Toledo, Ohio, assignor to Alice B. Cramer, Toledo, Ohio

Application June 3, 1932, Serial No. 615,243

24 Claims. (Cl. 49—35)

The present invention relates to improvements in presses for forming glass articles, such as may be formed in molds from plastic or molten glass. It relates particularly to the location of the pressing stations at which the glass articles are formed in the molds, and to the mechanism for presenting the molds to the pressing stations.

It is customary to mount a series of molds on a rotatable table, and, by a station to station movement, to present the molds successively to a charging station to receive the charges of molten glass, and thence to a pressing station to form glass articles in the molds from said molten glass. In such devices the rate of production depends upon the time required for moving the mold from the charging station to the pressing station, and the time required for properly setting the article in the mold at the pressing station.

Another customary method provides an individual plunger for each of the molds. The plungers and molds are mounted on a rotatable table for synchronous movement. This type of a device provides unlimited time for the pressing operation, but it is accomplished by excessive multiplicity of parts. Furthermore, in a device of this description, the pressure available for forming the article is limited, and the device is adapted only to manufacture certain classes of ware.

One of the objects of the present invention is to provide a press with a plurality of pressing stations, and mechanism for selectively distributing successive molds to these pressing stations, in such a manner additional pressing time may be provided for the pressing operation.

Another object is to provide conveying mechanism for moving the molds in a predetermined path to designated stations in a manner to permit the molds remaining for different periods of time at different stations.

Another object is to provide a press wherein the minimum amount of mechanism is moved in transporting the molds throughout the operating cycle.

Another object is to provide a rectilineal path, through which the molds travel, and with independently operated conveying mechanisms.

Other objects will be apparent hereinafter.

In the accompanying drawings:

Figure 6 is a sectional view in elevation along the lines 6—6 of Figure 1, and shows the transfer mechanism used for moving the mold units at the charging and pressing stations.

Figure 7 is a sectional view in elevation along the lines 7—7 of Figure 1, and shows particularly the pressing units.

In the accompanying drawings is shown a press for forming glass articles in molds, which embodies the elements of this invention. It consists of a plurality of conveyors arranged to form a rectilineal pathway, and a series of mold units adapted to move successively and independently of each other through this pathway. A charge of molten glass is delivered to each of the molds successively at the charging station, and the molds are then moved rapidly and successively to the pressing stations. Two pressing stations are provided, and the molds are alternately distributed to these stations, each mold being succeeded at its particular station by the second mold following. Thus, a longer period of time is provided for the pressing operation than if each mold were followed by the next succeeding mold. A portion of each pressing operation is simultaneous with the pressing operation of the preceding mold, and another portion is simultaneous with the pressing operation of the succeeding mold. The molds, when leaving the pressing stations, are in the same sequence as when leaving the charging station, and are moved in such sequential relation to the take-out station for the removal of the glass article therefrom. During such passage the glass article is sufficiently cooled that it retains its pressed shape when removed from the mold.

Figure 5:
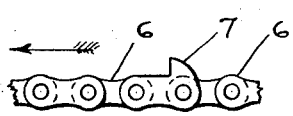
Figure 5 is a view in elevation, showing in detail the chain used for moving the mold units.

The molds 1 are mounted in rectilineal mold holders 2. These mold units are moved in the guideways 3 and 4 to the charging station, by means of the conveyor 5, which, as shown in Figure 5 of the drawings, consists of an endless chain comprising a series of plain links 6 with projecting links 7 spaced at regular intervals throughout the length of the conveyor, the projecting links are adapted to engage the mold units to move them in the guideways.

At the charging station each mold unit is permitted to remain at rest for a period of time sufficient to receive the charge of molten glass from the feeder, not shown, through the chute 8. This rest period is accomplished by providing a definite lapse of time after the mold unit is deposited by the conveyor 5, and before the air motor 9 is actuated. The air motor 9, as shown particularly in Figures 6 and 8 of the drawings, is operated by the control valve 10, which is actuated by the cam 11. The cam 11 is secured to the shaft 12, which is driven by the gears 13 and 14, and so timed that it makes one complete revolution for each charge of molten glass delivered at the charging station. The cam is so constructed that the air motor is reversed, and the pusher member returned to its initial position, as soon as the pushing stroke is completed. The slide 15 is movable in the slideway 16, and is provided with an upwardly projecting portion 17, adapted to engage the mold unit, to push it from the charging station to a position between the presses. Attached to the slide 15, and positioned in front of the projecting portion 17, is an upwardly projecting member 18, pivoted at 19. The member 18 is adapted to engage the mold unit just delivered from the presses, and to slide it in the path of the conveyor 20; it is pivoted to permit it to return to its initial position, by passing beneath the mold unit which has just been moved from the charging station by the projecting finger 17. The spring 21 is adapted to return the member 18 to vertical position, when it has passed beneath this mold unit.

As shown in Figure 7 of the drawings, the mechanism, for selectively distributing the series of mold units to the pressing stations, comprises a vertically disposed lever 22, pivoted at 23, and actuated by the air motor 24, by means of the connecting link 25. The control valve 26 for this air motor is actuated by the cam 27, secured to the shaft 28, which is rotated, by the gears 29 and 30, at a speed of one-half revolution for each charge of molten glass delivered at the charging station. This cam is so constructed that the air motor is reversed each one-half revolution of the shaft 28. Thus, the lever 22 is oscillated back or forth each one-half revolution of the shaft, and mold units are thus pushed to alternate presses each one-half revolution of the shaft. The cam 27 is so positioned on the shaft 28, that the arm 22 is moved as soon as the slide 15 has been withdrawn from its path of oscillation, as previously described.

For removing the mold units from the presses, there are provided two duplicate units positioned to operate in opposed directions, and one for each press. These units each comprise a vertically positioned lever 31, whose upper end is adapted to engage the mold unit, and whose lower end is fulcrumed at 32. Intermediate its ends is connected the link 33, controlled by the air motor 34, which is actuated by air under pressure in one direction, and returned to its initial position by the tension spring 35, one end of which is attached to the lever adjacent the link 33 and the other end of which is attached to the non-movable portion of the air motor 34. The air motors are controlled by their respective control valves 37, which are actuated by their respective cams 38, secured to the shaft 28. As previously described, this shaft 28 rotates at a speed of one-half revolution for each charge of molten glass delivered at the charging station, or, one revolution for every second succeeding mold unit. The cams 38 are so positioned on the shaft 28 that one of the two levers 31 completes the ejection of a mold unit just prior to the operation of the slide 15, and in time for the projecting member 18 to engage it and push it into the path of the conveyor 20.

The conveyor 20 is a continuously moving endless chain, comprising plain links 6, and a number of equally spaced projecting links 7, similar to the previously described conveyor 5. The projecting links 7 are so positioned, and their movement so timed, by means of the chain drive 39 and the gears 51 and 52, that each mold, as it is released by the pusher member 18, is engaged by a corresponding projecting link 7, of the conveyor 20, and pushed thereby along the slideways 40 and 41, towards the take-out station.

Figure 4:
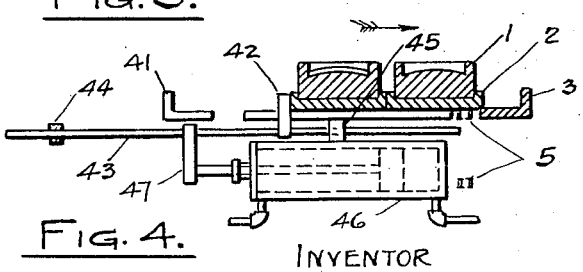
Figure 4 is a sectional view in elevation along the lines 4—4 of Figure 1, and shows the transfer mechanism at the take-out station.

Each mold unit, when released by the conveyor 20, is in position to be transferred to the take-out station. Pusher mechanism, as shown particularly in Figure 4 of the drawings, is provided for this transfer, and comprises an upwardly projecting member 42, adapted to engage the mold unit. This member is secured to a horizontally movable rod 43, suitably guided in bearings 44 and 45. The rod 43 is rigidly secured to the movable portion of the air motor 46, by the vertically disposed bar 47. The air motor is double acting, and is controlled by the control valve 48, actuated by the cam 49, secured to the shaft 50, which is driven by the chain drive 39, and timed to make one complete revolution for each charge delivered at the charging station. The cam is so positioned on the shaft that the mold unit is pushed to the take-out station as soon as it is released by the conveyor 20, and is so constructed that the air motor is reversed, and the contact member 42 is returned to its initial position, as soon as the pushing stroke is completed.

At the take-out station the completed glass articles are manually removed from the mold units and successively transferred to a leer, or other suitable means for annealing.

In pushing the mold unit to the take-out station, the preceding mold, now empty, is forced, by the mold being moved to the take-out station, to move into the path of the continuously moving conveyor 5, the projecting links 7 of which engage it and push it towards the charging station as previously described.

Figure 1:
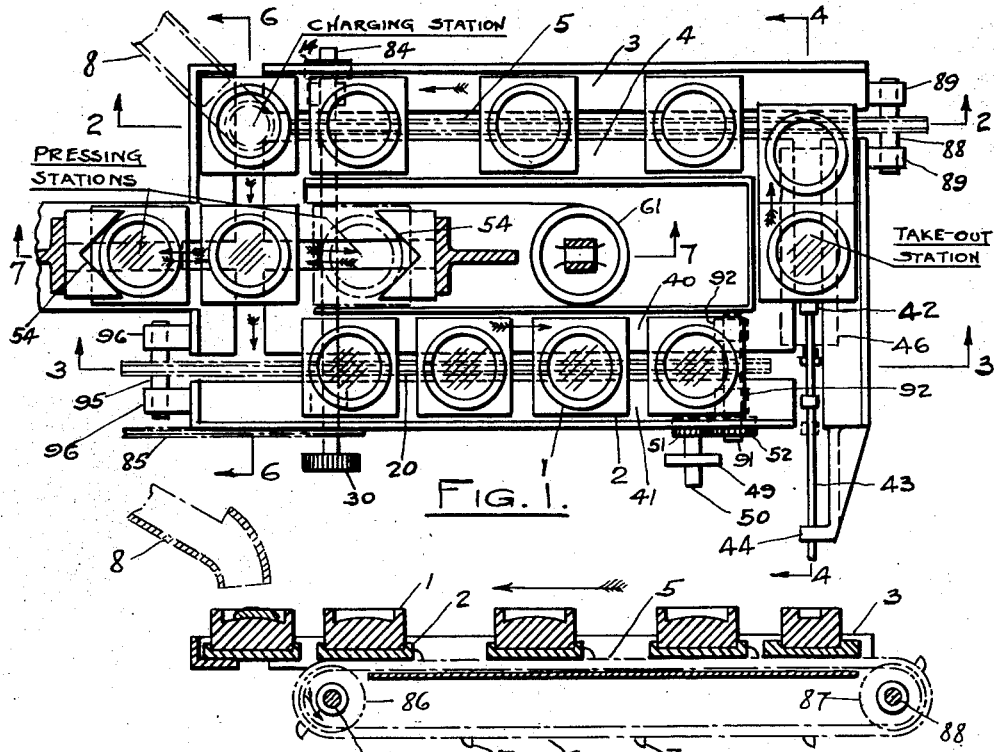
Figure 1 is a plan view of the proposed press, showing particularly the rectilineal path through which the mold units travel.
Figure 2:
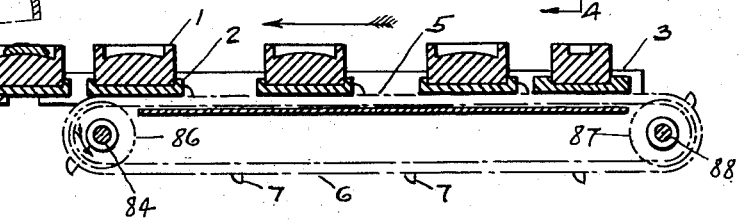
Figure 2 is a sectional view in elevation along the lines 2—2 of Figure 1, and shows one of the conveyor mechanisms.
Figure 3:
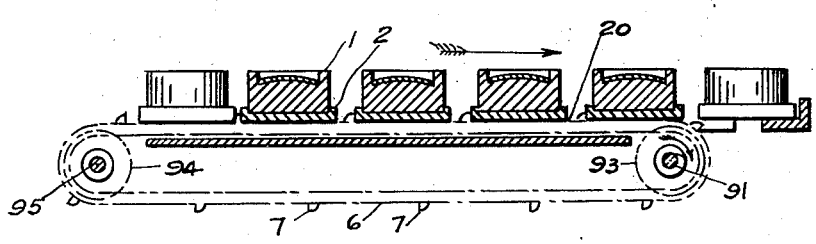
Figure 3 is a sectional view in elevation along the lines 3—3 of Figure 1, and shows another of the conveyor mechanisms.

Two pressing stations have been positioned adjacent the path of normal travel for the mold units, as shown in Figures 1 and 7 of the drawings, and the mold units are selectively distributed to these stations, as previously described.

Each pressing station has a forming plunger die 53, which is adapted to co-act with the mold 1 to form the glass article. A centering device 54 is provided to contact with the side of the mold to insure alignment of the mold and plunger die, when the mold is delivered to the pressing station. The press, shown in Figure 7 of the drawings, is a commonly used type of press, comprising a vertically disposed shank 55, suitably guided in bearings 56 and 57, the lower end of which supports the plunger die 53, and the upper end of which is attached to the link 58. Attached to the upper end of the link 58 is one end of the horizontally disposed rocker arm 59, the other end of which is connected to the vertically positioned single acting air motor 61, by means of the connecting rod 62. The air motor is upwardly actuated by the air under pressure admitted thereto by the control valve 63, which is actuated by the cam 64 secured to the shaft 28; and it is returned to its initial position by the spring 65, one end of which is attached to the rocker arm 59 adjacent the pivot 60, and the other end of which is attached to the frame of the press. The cam 64 is constructed to maintain the air under pressure in the air motor for a predetermined period of time, in order that the glass article may be completely formed in the mold. This period of time may exceed the period of time between successive charges at the charging station, but must be less than twice that period of time. The two cams 64 are so positioned on the shaft 28 that the presses are alternately actuated at equal intervals of time, and are actuated immediately after each mold unit has been delivered to the presses by the oscillating movement of the lever 22.

Figure 8:
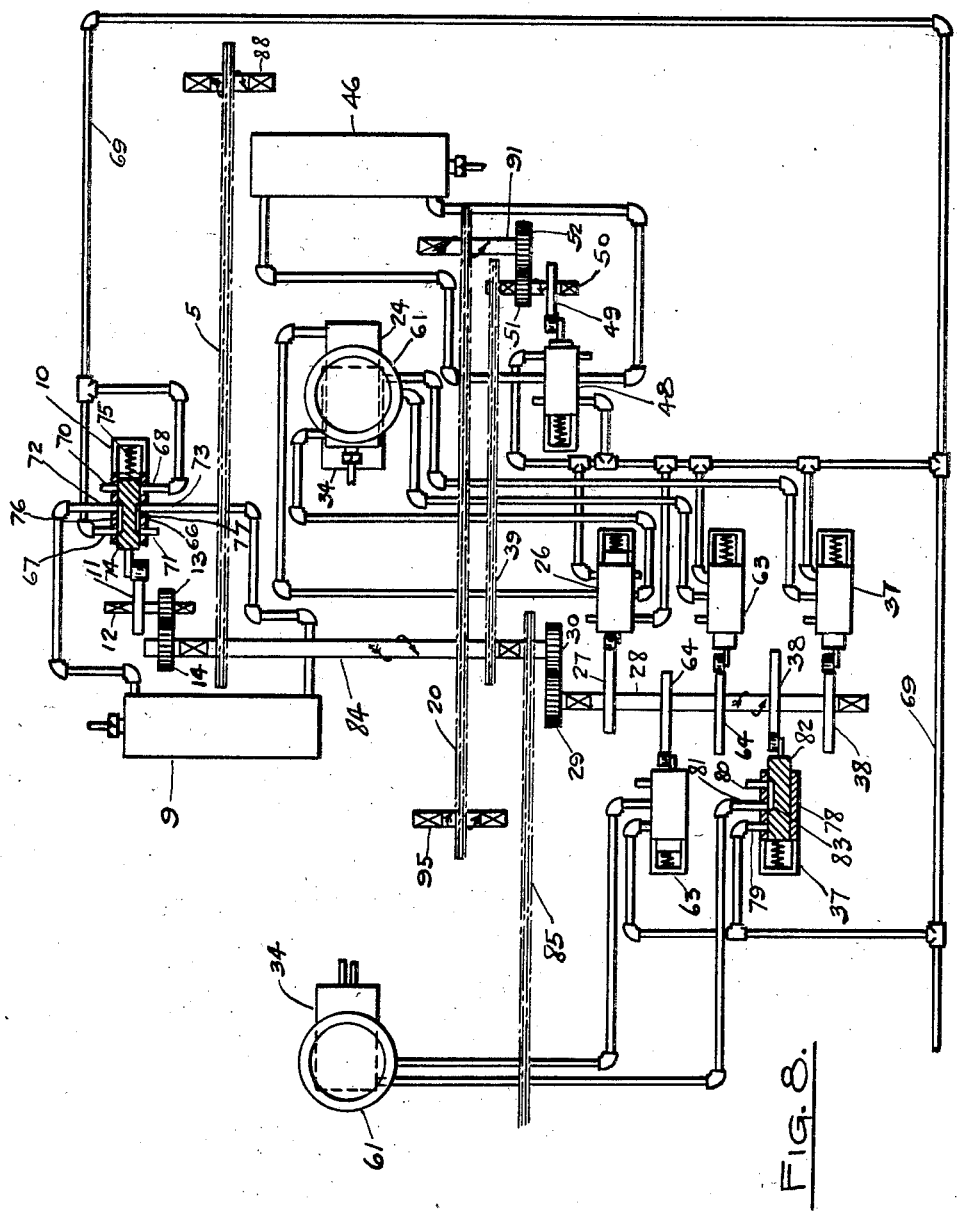
Figure 8 is a diagrammatic plan view of the drive mechanism and the piping to the air motors, and shows particularly the means for timing the various movements.

The control valves, as shown in the drawings, are of a type commonly used for controlling air motors. In this device there is one type control for controlling the double acting air motors, and another type for controlling the single acting air motors. As shown in Figure 8 of the drawings, the valves 10, 26 and 48 are used for controlling the double acting air motors, and each comprise a body portion 66, with ports 67 and 68 located at opposite ends and on opposite sides thereof, and connected by piping 69 to a suitable source of supply of air under pressure, not shown. Aligned with the ports 67 and 68, and located on opposite sides of the body therefrom are exhaust ports 70 and 71. Intermediate the ports 67 and 70, and aligned with them is the port 72, which is connected by suitable piping with one end of the air motor; and connected with the other end is the port 73, positioned intermediate the ports 68 and 71 and aligned therewith. The movable valve 74 is held in contact with its previously described cam, by means of the spring 75 pressing against the farther end of the valve. The valve 74 contains ports 76 and 77, adapted to align respectively with the ports 67, 70 and 72, and ports 68, 71 and 73, previously described. Thus, the position of the valve determines which end of the air motor is supplied with air under pressure, while the opposite end is connected with the atmosphere.

The control valves 37, 37, 63 and 63 are constructed and operated similarly to the valves 10, 26 and 48, and have a single series of ports. The body portion 78 is provided at one end with the port 79 connected to the source of supply of air under pressure through the piping 69. At the opposite end and in alignment therewith is the exhaust port 80 connected to the atmosphere. Intermediate these ports and aligned therewith is port 81 connected by suitable piping to one end of the air motor. The movable valve 82 has a single port 83, which is adapted to register with the ports 79, 80 and 81. Thus, the position of the valve in the valve body determines whether the air motor is connected with the supply of air under pressure, or with the atmosphere.

The timing of the various conveyor and pushing mechanisms, as shown in Figure 8 of the drawings, is accomplished by the established relation between the driving mechanisms and the control cams for the air motors. The shaft 84 is continuously rotated by any suitable source of power, not shown, and the drive chain 85 connects the shaft with the timing unit of a feeder for molten glass, not shown, and establishes a definite relation between the number of charges delivered per minute at the charging station and the speed of rotation of this shaft. Secured to the shaft 84 is the previously described gear 14, adapted, by means of the gear 13, to actuate the cam 11 at the speed of one revolution for each charge delivered at the charging station. The drive sprocket 86, also secured to the shaft 84, moves the conveyor 5 at a predetermined speed to deliver a mold unit at the charging station prior to the delivery of each charge. The opposite end of the conveyor 5 is supported by the driven sprocket 87, secured to the shaft 88, which is mounted in suitable bearings 89. The chain drive 39, actuated by the shaft 84, is adapted to rotate the shaft 50, with the cam 49 secured thereto, at the speed of one revolution for each charge of molten glass delivered at the charging station. The drive sprocket 93, of the conveyor 20, is secured to the shaft 91, which is rotated by the shaft 50, by means of the gears 51 and 52, at a speed adapted to move the conveyor 20 at a suitable speed to engage each successive mold, as it is delivered from the pressing stations. The opposite end of the conveyor 20 is supported by the driven sprocket 94, secured to the shaft 95, which is mounted in the bearings 96. Mounted on the shaft 84 is the gear 30, which rotates the shaft 28, by its corresponding gear 29, at a speed of one complete revolution for every two charges of molten glass delivered at the charging station. This speed is established, because the cams mounted on the shaft 28 are used for the control of the two pressing units and their various mechanisms.

The various movements of the conveyors and cams are correlated as described, and the sprockets and cams are secured to their respective shafts in such a manner that each conveying element will transfer a mold unit to the following conveying element, so as to produce a sequential movement of the series of molds, and the desired period of rest at each transfer station. These periods of rest may be of different duration at the different transfer stations.

Modifications of the previously described structure may be resorted to, within the spirit and scope of the appended claims.

What I claim is:

1. In a press for forming glass articles, a plurality of molds, a charging station for delivering charges of molten glass to successive molds, means for moving the molds in a common path to the charging station, a plurality of pressing stations for forming said charges in said molds, and means for selectively delivering said molds to said pressing stations.

2. In a press for forming glass articles, a plurality of molds, a charging station for delivering charges of molten glass to said molds, a conveyor for moving successive molds to said charging station, a motor, and means actuated thereby at a speed different from and independent of that of said conveyor for removing successive molds from said charging station.

3. In a press for forming glass articles, a mold, a plunger coacting with the mold to form glass articles in the mold, a charging station for delivering a charge of molten glass to said mold, continuously moving means for carrying said mold to said charging station, and means having interrupted movement for removing said mold from said charging station.

4. In a press for forming glass articles, a mold, a plunger coacting with the mold to form glass articles in the mold, a charging station for delivering a charge of molten glass to said mold, means for carrying said mold in a lineal path to said charging station, and automatic means operating intermittently for removing said mold from said charging station in a lineal path extending transversely of said first mentioned path.

5. In a press for forming glass articles, a mold, a plunger coacting with the mold to form glass articles in the mold, a charging station for delivering a charge of molten glass to said mold, means for carrying said mold in a lineal path to said charging station, and means for removing said mold from said charging station in a lineal path, said lineal paths being angularly related.

6. In a press for forming glass articles, a plurality of molds, means for moving said molds successively in a rectilineal path, a charging station positioned in said path, a plurality of pressing stations positioned adjacent said path, means for selectively carrying said molds from said path to said pressing stations, and means for returning said molds to said path.

7. In a press for forming glass articles, a mold, means for moving said mold through a predetermined path, a charging station positioned in said path, a pressing station positioned adjacent said path, means for moving said mold from said path to said pressing station, and means for returning said mold to said path.

8. In a press for forming glass articles, a plurality of molds, means for moving said molds successively through a predetermined common path, said means including a continuously moving conveyor by which the molds are carried through a portion of said path, a charging station positioned in said path, means for arresting the movement of said molds at said charging station, a pressing station, and means for arresting the movement of said molds at said pressing station, the duration of said arrested movement at said charging station varying from the duration of the arrested movement at said pressing station.

9. In a press for forming glass articles, a mold, a charging station for delivering a charge of molten glass to said mold, a pressing station, means for moving said mold from said charging station to said pressing station, interruptedly moving means for removing said mold from said pressing station, and means having continuous movement adapted to move said mold when released from said interruptedly moving means.

10. In a press for forming glass articles, a mold, a charging station for delivering a charge of molten glass to said mold, a pressing station, means for moving said mold from said charging station to said pressing station, means for removing said mold from said pressing station, continuously moving means adapted to engage said mold when removed from said pressing station, and interruptedly moving means for moving said mold when released by said continuously moving means, whereby the glass articles may be removed from the molds at a period of arrested movement.

11. In a press for forming glass articles, a mold, a charging station, a pressing station, a take-out station, means for moving said mold to said stations, and means for resting said mold at said stations for predetermined periods of time, said rest periods being of different duration at different stations.

12. In a press for forming glass articles, a plurality of molds, a charging station, a pressing station, a take-out station, and means for moving said molds successively and sequentially to said stations, said means constructed to rest each mold at said stations for predetermined periods of time of different duration at each of said stations while maintaining the molds in sequential relation.

13. The process of making glass articles which comprises subdividing a stream of molten glass into successive charges, selectively diverting said charges to a plurality of pressing stations, pressing glass articles at said pressing stations from said charges, and delivering said glass articles from said pressing stations to a common path of delivery.

14. The process of forming glass articles in molds, which comprises moving a series of molds in a common path to a charging station, forming charges from masses of molten glass, delivering said charges successively to said molds, moving said molds successively after delivery of said charges, and forming said charges into glass articles by a single pressing action on each of the charges in sequence and in its mold while it is at rest, and continuing the pressing action on each charge during a portion of the time of the pressing action on the next succeeding charge.

15. The process of forming glass articles in molds, which comprises delivering charges of molten glass to a series of molds movable in succession in a common path, and pressing each of said charges into a glass article by a single pressing operation in over-lapping sequence with the preceding pressing operation and while the mold is at rest.

16. The process of forming glass articles by pressure in molds, which comprises moving a series of molds in succession in a common path to a charging station, delivering measured charges of molten glass to said molds, and pressing each charge by a single pressing action to form a glass article in a mold while at rest and simultaneously with the pressing operations on the preceding and succeeding molds.

17. The process of forming glass articles by pressure in molds, which comprises moving a series of molds in succession in a common path to a charging station, delivering measured charges of molten glass to said molds, and pressing each charge by a single pressing action to form a glass article in a mold while at rest and simultaneously with the completion of the pressing operation on the preceding mold and simultaneously with the start of the pressing operation on the succeeding mold.

18. In a press for forming glass articles, a mold, a charging station, a conveyor, means for driving the conveyor and thereby moving said mold to said charging station, a motor, means actuated thereby at a speed independent of that of the conveyor for removing said mold from said charging station, a pressing station, means for moving said mold to said pressing station, and means for resting said mold at said stations for predetermined periods of time, said rest periods being of different duration at different stations.

19. The process of forming glass articles in molds, which comprises delivering charges of molten glass to a series of molds movable in succession in a common path, diverting alternate molds with their charges to different pressing stations for prolonged pressing operations, and returning said molds with their finished glass articles to their original sequential relation when the pressing operations are completed.

20. The process of forming glass articles in molds, which comprises delivering charges of molten glass to a series of molds movable in succession, diverting alternate molds to different pressing stations for prolonged pressing operations, returning said molds to their original sequential relation, and moving them in a common path when the pressing operations are completed.

21. The process of forming glass articles in molds, which comprises delivering charges of molten glass to a series of molds movable in a common path, diverting alternate molds to different pressing stations for prolonged pressing operations, returning said molds to their original sequential relation, and moving them in a common path when the pressing operation is completed.

22. The process of forming glass articles in molds, which comprises subdividing a stream of molten glass into successive charges, delivering the charges to the molds in a predetermined sequential relation selectively diverting said charges in their molds to a plurality of pressing stations, forming said charges into glass articles by a pressing operation of greater duration than the interval of time between the formation of successive charges, and delivering said glass articles when the pressing operation is completed in their molds in their original said sequential relation from the pressing stations in a common path.

23. In a press for forming glass articles, a plurality of molds, a charging station for delivering charges of molten glass successively to said molds, means for moving the molds in a common path to the charging station, a plurality of pressing stations, means for moving the molds from the charging station to the pressing stations, the pressing stations including means for forming said charges in the molds by a single pressing action on each charge.

24. A press for forming glass articles comprising a plurality of molds, a charging station including means for delivering charges of molten glass to the molds, shaping means cooperating with the molds to shape the articles in the molds, said shaping means being spaced from the charging station, mechanism for moving the molds in succession from the charging station to said shaping means at a relatively high speed and from said shaping means to the charging station, said mechanism including means for causing the molds during their travel toward the charging station to move at a substantially slower speed than that at which they are moved from the charging station to said shaping means.

ALBERT N. CRAMER.